United States Patent
Zheng

(10) Patent No.: US 9,964,671 B2
(45) Date of Patent: May 8, 2018

(54) DISPLAY SUBSTRATE, DISPLAY PANEL, AND STEREOSCOPIC DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiaoyi Zheng, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 68 days.

(21) Appl. No.: 14/415,670

(22) PCT Filed: May 27, 2014

(86) PCT No.: PCT/CN2014/078537
§ 371 (c)(1),
(2) Date: Jan. 19, 2015

(87) PCT Pub. No.: WO2015/090003
PCT Pub. Date: Jun. 25, 2015

(65) Prior Publication Data
US 2016/0018569 A1    Jan. 21, 2016

(30) Foreign Application Priority Data
Dec. 17, 2013   (CN) .......................... 2013 1 0693259

(51) Int. Cl.
*G02B 3/00*    (2006.01)
*G02B 5/00*    (2006.01)
(Continued)

(52) U.S. Cl.
CPC .......... *G02B 3/0087* (2013.01); *G02B 5/003* (2013.01); *G02B 5/201* (2013.01); *G02B 27/2214* (2013.01)

(58) Field of Classification Search
CPC .. G02B 3/0087; G02B 3/0037; G02B 3/0043; G02B 3/005; G02B 3/0056; G02B 5/003;
(Continued)

(56) References Cited

U.S. PATENT DOCUMENTS 5,223,962 A    6/1993  Shioji et al.
2002/0044249 A1  4/2002  Hirota
(Continued)

FOREIGN PATENT DOCUMENTS

CN    101511035 A    8/2009
CN    201293898 Y    8/2009
(Continued)

OTHER PUBLICATIONS

Chinese Office Action dated Sep. 30, 2015 issued in corresponding Chinese Application No. 201310693259.4.
(Continued)

*Primary Examiner* — Thomas K Pham
*Assistant Examiner* — Marin Pichler
(74) *Attorney, Agent, or Firm* — Nath, Goldberg & Meyer; Joshua B. Goldberg

(57) ABSTRACT

The present invention provides a display substrate including a plurality of pixel units. Wherein, the plurality of pixel units include a plurality of oblique pixel units, and length directions of the plurality of oblique pixel units are oblique relative to a horizontal direction. The present invention further provides a display panel and a stereoscopic display device. When stereoscopic display is performed using the display panel according to the present invention, the resolutions of each parallax image in both a length direction and
(Continued)

a width direction of the display panel decrease, i.e., the problem that the resolution of a single-eye image decreasing only in one direction when stereoscopic display is performed is avoided, thereby improving the display effect.

7 Claims, 2 Drawing Sheets

(51) Int. Cl.
  *G02B 27/22* (2018.01)
  *G02B 5/20* (2006.01)
(58) Field of Classification Search
  CPC .... G02B 5/201; G02B 27/2214; G02B 27/22; G02B 27/2207; G02B 27/2228; G02B 27/2242; G02B 27/225; H04N 13/0402; H04N 13/0404; H04N 13/0406; H04N 13/0415; H04N 13/0422
  USPC .......... 359/462–466, 477; 348/42, 51, 54–60
  See application file for complete search history.

(56) References Cited

U.S. PATENT DOCUMENTS

| | | | |
|---|---|---|---|
| 2005/0140893 | A1 | 6/2005 | Hong |
| 2008/0316379 | A1* | 12/2008 | Zuidema ............ H04N 13/0404 349/15 |
| 2010/0289994 | A1* | 11/2010 | Nonaka ............. G02F 1/133514 349/108 |
| 2013/0128354 | A1* | 5/2013 | Whangbo .......... G02B 27/2214 359/463 |
| 2014/0098418 | A1* | 4/2014 | Lin .................... G02B 27/2214 359/463 |

FOREIGN PATENT DOCUMENTS

| | | |
|---|---|---|
| CN | 102246528 A | 11/2011 |
| CN | 202693954 U | 1/2013 |
| CN | 102959959 A | 3/2013 |
| CN | 102970558 A | 3/2013 |
| CN | 103323968 A | 9/2013 |
| CN | 103440824 A | 12/2013 |
| CN | 103680325 A | 3/2014 |
| DE | 10 2010 009 291 A1 | 8/2011 |
| JP | 2008135333 A | 6/2008 |
| JP | 2013068848 A | 4/2013 |

OTHER PUBLICATIONS

First Office Action dated Apr. 1, 2015 corresponding to Chinese application No. 201310693259.4.
Written Opinion of the International Searching Authority dated Sep. 24, 2014 corresponding to International application No. PCT/CN2014/078537.
International Search Report for International Application No. PCT/CN2014/078537.

* cited by examiner

DISPLAY SUBSTRATE, DISPLAY PANEL, AND STEREOSCOPIC DISPLAY DEVICE

This is a National Phase Application filed under 35 U.S.C. 371 as a national stage of PCT/CN2014/078537, filed May 27, 2014, an application claiming benefit under 35 U.S.C. 119 of Chinese Application No. 201310693259.4, filed Dec. 17, 2013, the content of each of which is hereby incorporated by reference in its entirety.

FIELD OF THE INVENTION

The present invention relates to the field of display technology, in particular, relates to a display substrate, a display panel including the display substrate, and a stereoscopic display device including the display panel.

BACKGROUND OF THE INVENTION

FIG. 1 shows a display device capable of achieving naked-eye stereoscopic display. The display device includes a display panel 100 and a columnar lens grating 200 arranged at the light outgoing side of the display panel 100. The principle that the display device as shown in FIG. 1 achieves naked-eye stereoscopic display is as follows. As shown in FIG. 2, description is made by taking four viewpoints as an example. Each grating unit of the columnar lens grating 200 may correspond to four sub-pixels of the display panel 100, and the four sub-pixels display four parallax images 1, 2, 3, and 4, respectively. Wherein, the parallax images 1 and 2 are right-eye images, and the parallax images 3 and 4 are left-eye images. The left eye and the right eye of a viewer can view different viewpoints 1', 2', 3', and 4' within a certain distance through the light splitting function of the columnar lens grating 200, thereby achieving stereoscopic perception. For example, the left eye of the viewer can only view the parallax image 2, and the right eye of the viewer can only view the parallax image 3, thereby a stereoscopic image being synthesized in the viewer's brain.

As stated above, in order to increase a viewable region, a plurality of parallax images are generally displayed on a display panel at the same time in a certain arrangement manner. Since the physical resolution of a display is fixed, the resolution of a single-eye image will decrease.

Specifically, as shown in FIG. 3, an array substrate is divided into a plurality of pixel units, each of which includes a red sub-pixel R, a green sub-pixel G, and a blue sub-pixel B. The sub-pixels between two adjacent black thick lines correspond to a cylindrical lens of the columnar lens grating. The sub-pixels with reference sign 1 constitute the parallax image 1, and form the viewpoint 1' after being light split by the columnar lens grating. The sub-pixels with reference sign 2 constitute the parallax image 2, and form the viewpoint 2' after being light split by the columnar lens grating. The sub-pixels with reference sign 3 constitute the parallax image 3, and form the viewpoint 3' after being light split by the columnar lens grating. The sub-pixels with reference sign 4 constitute the parallax image 4, and form the viewpoint 4' after being light split by the columnar lens grating. After being light split by the columnar lens grating, the parallax image 1 can be viewed at the viewpoint 1'; the parallax image 2 can be viewed at the viewpoint 2'; the parallax image 3 can be viewed at the viewpoint 3'; and the parallax image 4 can be viewed at the viewpoint 4'. Each of the parallax images only has a quarter of the overall resolution. It can be seen that, in a case where stereoscopic display is achieved with four parallax images, the resolution of the single-eye image in a length direction of the display panel (a row direction of the pixel units) will decrease to a quarter of the original resolution, and the resolution of the single-eye image in a width direction of the display panel (a column direction of the pixel units) remains unchanged. Since the resolution of the single-eye image decreases only in one direction, a stereoscopic viewing effect will be affected adversely.

Therefore, how to mitigate the degradation of viewing effect due to the resolution of the single-eye image decreasing only in one direction is a technical problem to be solved urgently in the art.

SUMMARY OF THE INVENTION

An object of the present invention is to provide a display substrate, a display panel including the display substrate, and a stereoscopic display device including the display panel, wherein the resolution of the stereoscopic display device including the display substrate decreases not merely in one direction.

In order to achieve the above object, as one aspect of the present invention, there is provided a display substrate including a plurality of pixel units. Wherein, the plurality of pixel units include a plurality of oblique pixel units, and length directions of the plurality of oblique pixel units are oblique relative to a horizontal direction.

Preferably, the plurality of oblique pixel units are parallel to each other.

Preferably, an angle between the length direction of the plurality of oblique pixel units and the horizontal direction ranges from 30 degrees to 60 degrees.

Preferably, the plurality of oblique pixel units are rectangles, rhombuses, or ellipses.

Preferably, the plurality of pixel units are configured to be rectangles, a display region of the display substrate includes a central display region and a peripheral display region surrounding the central display region, the plurality of oblique pixel units are arranged in the central display region, the peripheral display region is provided with a plurality of supplementary pixel units, and the plurality of oblique pixel units and the plurality of supplementary pixel units are arranged to form a rectangular display region.

Preferably, the display substrate includes a plurality of gate lines and a plurality of data lines, and the plurality of gate lines and the plurality of data lines are zigzag to define the plurality of oblique pixel units.

Preferably, the plurality of pixel units include red pixel units, green pixel units, and blue pixel units, the display substrate includes a black matrix which includes a plurality of zigzag transversal lines and a plurality of zigzag longitudinal lines, and the plurality of transversal lines and the plurality of longitudinal lines cross with each other to define the plurality of oblique pixel units.

As another aspect of the present invention, there is provided a display panel. Wherein, the display panel includes the above display substrate according to the present invention.

As still another aspect of the present invention, there is provided a stereoscopic display device. Wherein, the stereoscopic display device includes the above display panel according to the present invention and a grating. A length direction of each grating unit of the grating is parallel to the length direction of the oblique pixel unit.

Preferably, the grating is a columnar lens grating.

When stereoscopic display is performed using the display panel according to the present invention, the resolutions of each parallax image in both a length direction and a width direction of the display panel decrease, i.e., the problem that the resolution of the single-eye image decreasing only in one direction when stereoscopic display is performed is avoided, thereby improving a display effect.

BRIEF DESCRIPTION OF THE DRAWINGS

The drawings are intended to provide better understanding of the present invention, and constitute a part of the description. Together with the following embodiments, the drawings serve to describe the present invention, but not to limit the present invention. Wherein.

DESCRIPTION OF THE REFERENCE SIGNS

100: display panel
200: grating
201: grating unit
300: grate line (or transversal line of black matrix)
400: data line (or longitudinal line of black matrix)

DETAILED DESCRIPTION OF THE EMBODIMENTS

Embodiments of the present invention will be described in detail below with reference to the drawings. It should be understood that the embodiments described herein are only for the purpose of describing and explaining the present invention, but not to limit the present invention.

Figure 4:
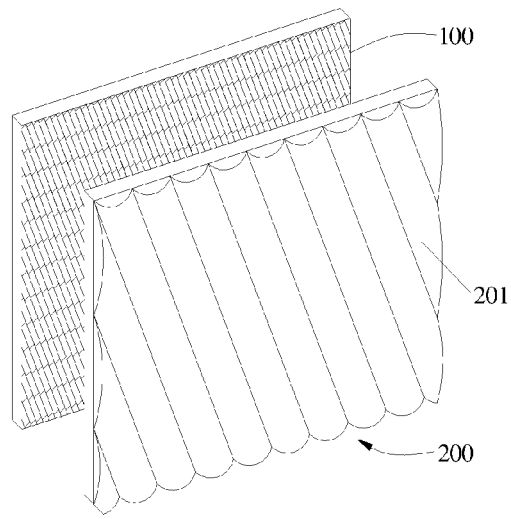
FIG. 4 is a schematic diagram showing a stereoscopic display device according to the present invention.
Figure 5:
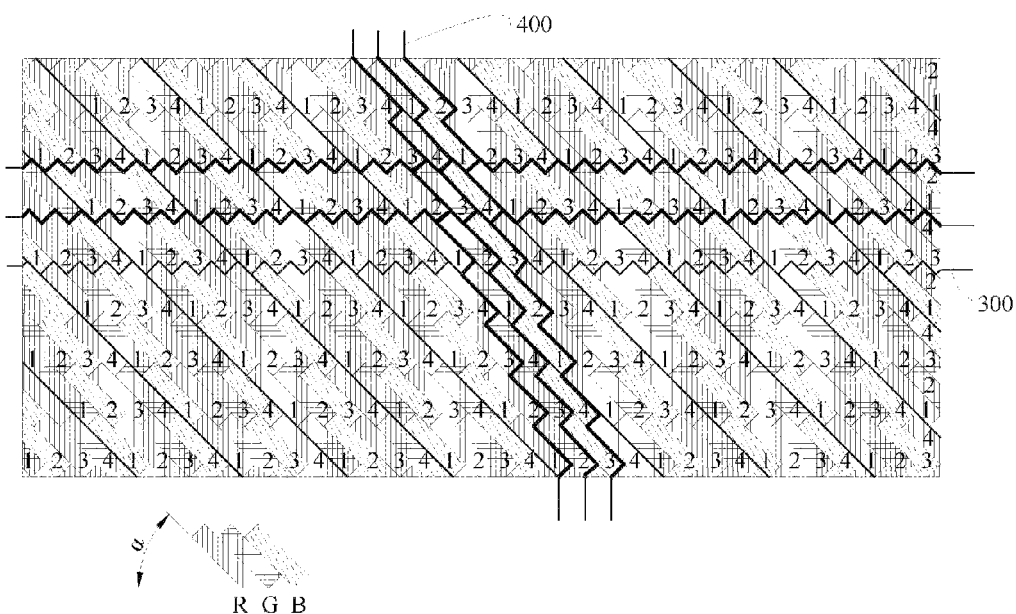
FIG. 5 is a schematic diagram showing a display substrate according to the present invention and showing decrease of the resolution of each parallax image.

As one aspect of the present invention, as shown in FIGS. 4 and 5, there is provided a display substrate including a plurality of pixel units. Wherein, at least a part of the plurality of pixel units are oblique pixel units, and length directions of the oblique pixel units are oblique relative to a horizontal direction.

In the embodiment as shown in FIG. 5, an angle between the oblique pixel unit and the horizontal direction is a. Here, the horizontal direction refers to the horizontal direction in FIG. 5. It is easily understood that, here, the content that "length directions of the oblique pixel units are oblique relative to a horizontal direction" refers to that the length directions of the oblique pixel units are neither parallel to the horizontal direction nor perpendicular to the horizontal direction.

As shown in FIG. 4, a display device including the display substrate further includes a grating 200. The grating 200 includes a plurality of grating units arranged parallel to each other. In the grating 200, a length direction of each grating unit 201 is parallel to the length direction of the oblique pixel unit.

The operating principle of the display substrate and the stereoscopic display device according to the present invention will be described below by taking a case where stereoscopic display is performed using four parallax images as an example.

Figure 1:
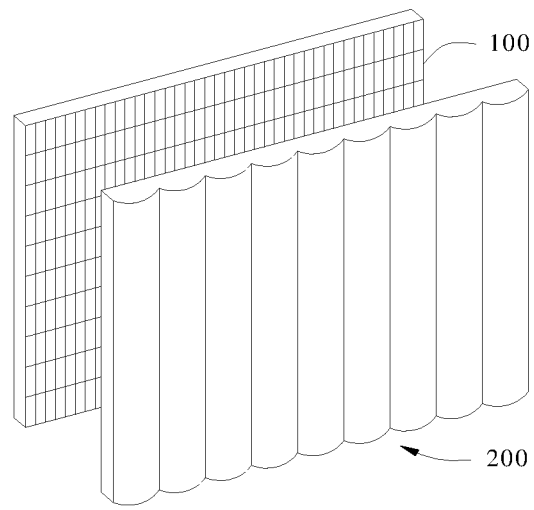
FIG. 1 is a schematic diagram showing an existing display device capable of achieving naked-eye stereoscopic display.
Figure 2:
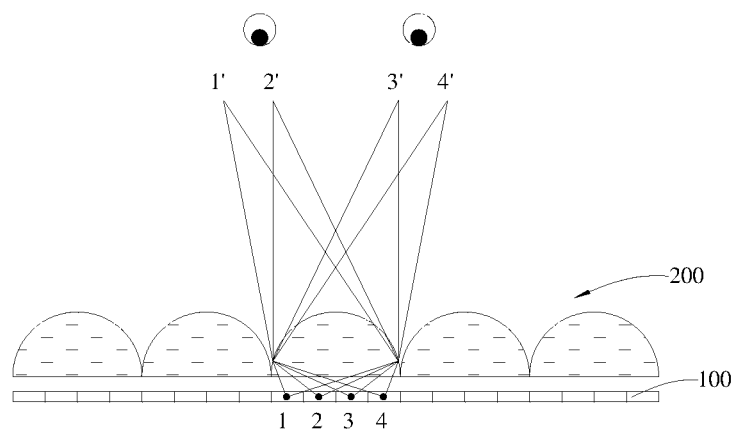
FIG. 2 is a schematic diagram showing principle for achieving naked-eye stereoscopic display.
Figure 3:
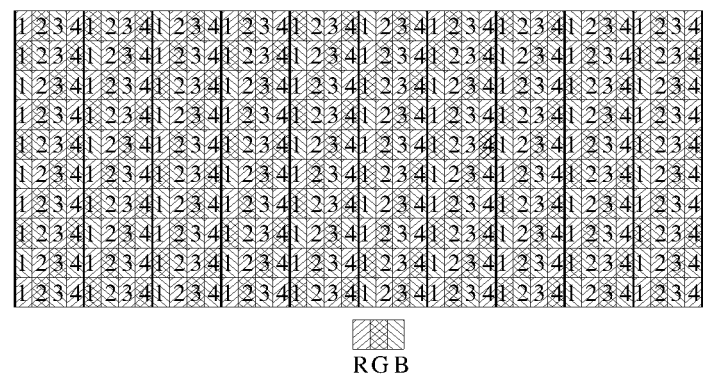
FIG. 3 is a schematic diagram showing that the resolution of each parallax image in the display device shown in FIG. 1 decreases in a length direction.

As shown in FIG. 5, each grating unit of the grating 200 corresponds to four columns of oblique pixel units. In FIG. 5, the oblique pixel units with reference sign 1 constitute the parallax image 1 in FIG. 2; the oblique pixel units with reference sign 2 constitute the parallax image 2 in FIG. 2; the oblique pixel units with reference sign 3 constitute the parallax image 3 in FIG. 2; and the oblique pixel units with reference sign 4 constitute the parallax image 4 in FIG. 2.

It can be seen from the figures that, as compared with two-dimensional display, the resolutions of the parallax image 1, the parallax image 2, the parallax image 3, and the parallax image 4 in both a length direction of the display panel (i.e., a length direction of the display substrate or the left-right direction in FIG. 5) and a width direction of the display panel (i.e., a width direction of the display substrate or the up-down direction in FIG. 5) decrease. It can be seen from this that, when stereoscopic display is performed, the display substrate according to the present invention can prevent the resolution of the single-eye image from decreasing only in one direction, thereby improving the display effect.

A person skilled in the art should be understood that, the resolution of each parallax image when stereoscopic display is performed is still a quarter of that of each parallax image when two-dimensional display is performed.

Preferably, the display substrate includes a plurality of oblique pixel units, so that the resolutions of the display panel including the display substrate decrease more uniformly. For ease of manufacturing, the plurality of oblique pixel units are parallel to each other.

As shown in FIG. 5, each of pixel units is a rectangle, and an angle between a length direction of each of the pixel units and the horizontal direction is a. Here, the horizontal direction refers to the horizontal direction in FIG. 5. It is easily understood that, here, the content that "length directions of the pixel units are oblique relative to a horizontal direction" refers to that the length directions of the pixel units are neither parallel to the horizontal direction nor perpendicular to the horizontal direction.

Further, the plurality of pixel units of the display substrate are configured to be rectangles. A display region of the display substrate may be divided into a central display region and a peripheral display region surrounding the central display region. The central display region can display most of a picture. Thus, in order to cause the resolutions to decrease more uniformly, the plurality of oblique pixel units may be arranged in the central display region of the display substrate, and the peripheral display region may be provided with a plurality of supplementary pixel units. It should be noted that, the plurality of oblique pixel units and the plurality of supplementary pixel units are arranged to form a rectangular display region. The shapes of the supplementary pixel units need not be rectangles. However, a proportion of the peripheral display region in the display panel to the whole display panel is very small, and thus the influence thereof on the central display region is small. In the embodiment as shown in FIG. 5, the peripheral display region has only one row of pixel units in the length direction of the display substrate, and also has only one row of pixel units in the width direction of the display substrate. In order to simplify the structure of the display substrate, the peripheral display region may be omitted. In this case, an edge of a display region may be zigzag-shaped. Since the size of the zigzag-shaped edge is very small, the display effect will not be affected.

In the present invention, the display substrate may be an array substrate. In this case, the display substrate includes a plurality of data lines and a plurality of gate lines, and both the plurality of data lines and the plurality of gate lines are not straight lines. As shown in FIG. 5, both data lines 400 and gate lines 300 are zigzag to define the plurality of oblique pixel units. FIG. 5 schematically shows only three data lines 400 and only three gate lines 300, but the numbers of the data lines 400 and the gate lines 300 of the display substrate are not limited thereto.

As an embodiment of the present invention, the display substrate may be a color filter substrate, and the plurality of pixel units may include red pixel units R, green pixel units G, and blue pixel units B. In this case, the display substrate may further include a black matrix corresponding to the oblique pixel units. In the present invention, the arrangement order of the pixel units of various colors is not specially limited. It is easily understood that, the black matrix may include zigzag transversal lines and zigzag longitudinal lines to define the plurality of oblique pixel units. FIG. 5 schematically shows only three transversal lines 400 and only three longitudinal lines 300, but the numbers of the transversal lines 400 and the longitudinal lines 300 of the black matrix are not limited thereto. It should be further understood that, the red pixel unit R, the green pixel unit G, and the blue pixel unit B only define the colors of the pixel units, and they can be the oblique pixel units or the supplementary pixel units.

As another embodiment of the present invention, the plurality of pixel units may include white pixel units.

As an embodiment of the present invention, the display substrate may be an organic light-emitting diode (OLED) display substrate. The plurality of pixel units may include red light-emitting units, green light-emitting units, and blue light-emitting units, and may further include light-emitting units of other colors.

In the present invention, the shape of each of the oblique pixel units is not limited to any specific shape. In a specific embodiment of the present invention, each of the oblique pixel units is a rectangle, and the length direction of the rectangle is the length direction of the oblique pixel unit. As an alternative embodiment of the present invention, each of the oblique pixel units may also be a rhombus, and the length direction of each of the oblique pixel units is the direction of longer diagonal of the rhombus. As another alternative embodiment of the present invention, each of the oblique pixel units may also be an ellipse, and the direction of major axis of the ellipse is the length direction of each of the oblique pixel units.

In the present invention, there is no specific limitation on a tilt angle of each of the oblique pixel units relative to the horizontal direction. For example, an angle between the length direction of the oblique pixel unit and the horizontal direction may range from 30 degrees to 60 degrees. Further preferably, the angle between the length direction of the oblique pixel unit and the horizontal direction may be 45 degrees, such that a loss of the resolution of each parallax image in the width direction of the display panel is the same as a loss of the resolution of each parallax image in the length direction of the display panel. Thus, a viewer can view a more uniform picture.

As another aspect of the present invention, there is provided a display panel, wherein the display panel includes the above display substrate according to the present invention. It is easily understood that, the display panel includes an array substrate having the structure of the above display substrate.

The display panel may further include a color filter substrate arranged opposite to the array substrate, and the color filter substrate also has the structure of the display substrate according to the present invention.

The display panel according to the present invention may be a liquid crystal display panel, an organic light-emitting diode display panel, an electronic paper, a plasma display panel (PHP), etc.

The display panel according to the present invention may be applied to any product or component having a display function, such as a mobile phone, a tablet computer, a television set, a display, a notebook computer, a digital photo frame, a navigator, and the like.

In order to decrease an influence of the peripheral display region on the central display region, preferably, a light non-transmissive region may be provided on the color filter substrate at a part corresponding to the peripheral display region. The light non-transmissive region may be a part of the black matrix.

As still another aspect of the present invention, there is further provided a stereoscopic display device including a grating 200 and the display panel 100 according to the present invention, wherein, a length direction of each grating unit 201 of the grating 200 is parallel to the length direction of each of the oblique pixel units, as shown in FIG. 4.

It is easily understood that, the grating 200 includes a plurality of grating units 201 parallel to each other. For example, a grating unit of a columnar lens grating is a columnar lens.

The grating units 201 are arranged so that the length direction of each of the grating units 201 is parallel to the length direction of each of the oblique pixel units, which brings about the following advantages: the number of the pixel units which can be covered by each of the grating units 201 is an integer (i.e., a pixel unit will not extend from one region covered by one grating unit into another region covered by another grating unit); thus, interference on the picture when stereoscopic display is performed can be decreased, and the display quality of the display device can be improved, thereby improving the sensory enjoyment of a viewer.

In the present invention, there is no specific limitation on a specific form of the grating. For example, the grating may be any one of a parallax barrier grating, a columnar lens grating, and a liquid crystal grating. In the embodiment as shown in FIG. 5, the grating 200 is a columnar lens grating, of which each grating unit is a columnar lens, and the length direction of each columnar lens is parallel to the length direction of each of the oblique pixel units.

It should be understood that, the foregoing embodiments are only exemplary embodiments used to explain the principle of the present invention, and the present invention is not limited thereto. Variations and improvements easily conceived by a person having ordinary skill in the art without departing from the spirit and essence of the present invention also fall within the protection scope of the present invention.

What is claimed is:

1. A display substrate including a plurality of pixel units, wherein, the plurality of pixel units include a plurality of oblique pixel units,
    wherein the display substrate further includes a black matrix, the black matrix includes a plurality of transversal lines and a plurality of longitudinal lines, each of the plurality of transversal lines comprises a plurality of identical first zigzag portions, each of the plurality of longitudinal lines comprises a plurality of identical second zigzag portions, each of the first zigzag portions comprises two sides which have an identical length and are connected to each other to form a right angle therebetween, each of the second zigzag portions comprises two sides which have different lengths and are connected to each other to form a right angle therebetween, a length of a shorter side of the two sides of each of the second zigzag portions is equal to the length of one of the two sides of each of the first zigzag portions, and the plurality of transversal lines and the plurality of longitudinal lines cross each other so that the shorter side of the two sides of each of the second zigzag portions completely coincides with one of the two sides of each of the first zigzag portions, the plurality of identical first zigzag portions of each of the plurality of transversal lines and the plurality of identical second zigzag portions of each of the plurality of longitudinal lines define the plurality of oblique pixel units in a plane where the black matrix is located, length directions of the plurality of oblique pixel units are oblique relative to a horizontal direction, each of the plurality of oblique pixel units is configured to be a rectangle, and the plurality of oblique pixel units are parallel to each other, wherein, a display region of the display substrate includes a central display region and a peripheral display region surrounding the central display region, the plurality of oblique pixel units are arranged in the central display region, the peripheral display region is provided with a plurality of supplementary pixel units, each of the plurality of supplementary pixel units has a shape different from that of each of the plurality of oblique pixel units, and the plurality of oblique pixel units and the plurality of supplementary pixel units are arranged to form a rectangular display region.

2. The display substrate according to claim 1, wherein, an angle between the length directions of the plurality of oblique pixel units and the horizontal direction ranges from 30 degrees to 60 degrees.

3. The display substrate according to claim 1, wherein, the plurality of pixel units include red pixel units, green pixel units, and blue pixel units.

4. The display substrate according to claim 2, wherein, the plurality of pixel units include red pixel units, green pixel units, and blue pixel units.

5. A display panel including the display substrate according to claim 1.

6. A stereoscopic display device including the display panel according to claim 5 and a grating, wherein, a length direction of each grating unit of the grating is parallel to the length directions of each of the plurality of oblique pixel units.

7. The stereoscopic display device according to claim 6, wherein, the grating is a columnar lens grating.

* * * * *